US009237586B2

(12) United States Patent
Liu et al.

(10) Patent No.: US 9,237,586 B2
(45) Date of Patent: Jan. 12, 2016

(54) MOBILE TERMINAL AND ACCESS METHOD FOR ENHANCED UPLINK RANDOM ACCESS CHANNEL (75) Inventors: Yu Liu, Beijing (CN); Chenglin Tu, Beijing (CN)

(73) Assignee: ST-ERICSSON SEMICONDUCTOR (BEIJING) CO., LTD., Beijing (CN)

( * ) Notice: Subject to any disclaimer, the term of this patent is extended or adjusted under 35 U.S.C. 154(b) by 240 days.

(21) Appl. No.: 13/993,367

(22) PCT Filed: Dec. 21, 2011

(86) PCT No.: PCT/CN2011/084378
§ 371 (c)(1),
(2), (4) Date: Nov. 23, 2013

(87) PCT Pub. No.: WO2012/083855
PCT Pub. Date: Jun. 28, 2012

(65) Prior Publication Data
US 2014/0071910 A1 Mar. 13, 2014

(30) Foreign Application Priority Data
Dec. 22, 2010 (CN) .......................... 2010 1 0618233

(51) Int. Cl.
*H04W 4/00* (2009.01)
*H04M 1/725* (2006.01)
*H04W 74/08* (2009.01)
*H04L 5/00* (2006.01)

(52) U.S. Cl.
CPC ......... *H04W 74/0833* (2013.01); *H04L 5/0078* (2013.01); *H04W 74/0866* (2013.01)

(58) Field of Classification Search
USPC ................. 370/329, 328; 455/412.1
See application file for complete search history.

(56) References Cited

U.S. PATENT DOCUMENTS

2004/0242204 A1* 12/2004 Ido et al. .................... 455/412.1
2009/0086671 A1*  4/2009 Pelletier et al. ............... 370/329
2010/0271939 A1* 10/2010 Gholmieh et al. ............. 370/228

FOREIGN PATENT DOCUMENTS

CN       101132350 A    2/2008
CN       102045784 A    5/2011
WO       2009089760 A1  7/2009

OTHER PUBLICATIONS

International Search Report issued in corresponding International application No. PCT/CN2011/084378.
3rd Generation Partnership Project; Technical Specification Group Radio Access Network; Medium Access Control (MAC) protocol specification (Release 8); 3GPP TS 25.321, v8.17.0 (Dec. 2012).

* cited by examiner

*Primary Examiner* — Kiet Tang
(74) *Attorney, Agent, or Firm* — Patent Portfolio Builders PLLC (57) ABSTRACT

The present invention provides a mobile terminal and an access method for an E-RUCCH. The method comprises: when upload data authorization information has expired and the amount of buffer data in a logical channel of the mobile terminal is zero, starting a timer; judging whether or not the timer is timed out, and if upload data authorization information is received before the timer is timed out, resetting the timer and initiating an E-RUCCH access; if the upload data authorization information is not received before the timer is timed out, resetting the timer when the timer is timed out and judging whether there is any buffer data in the logical channel; and when the amount of the buffer data in the logical channel exceeds a threshold of the buffer data in the logical channel, initiating the E-RUCCH access. Through the above-mentioned method and the mobile terminal, it is able to control the E-RUCCH access time of the mobile terminal and prevent the mobile terminal from initiating unnecessary, frequent access.

10 Claims, 4 Drawing Sheets

MOBILE TERMINAL AND ACCESS METHOD FOR ENHANCED UPLINK RANDOM ACCESS CHANNEL

TECHNICAL FIELD

The present invention relates to a field of mobile communication, in particular to a mobile terminal and an access method for an E-DCH (Enhanced Dedicated Channel) Random Access Uplink Control Channel (E-RUCCH).

BACKGROUND

Mobile communication technology has developed to the $3^{rd}$ generation (3G), and High Speed Uplink Packet Access (HSUPA) technology provides optimization and evolution for packet services in an uplink direction, i.e., in a direction from a mobile terminal to a wireless access network. By virtue of the HSUPA technology, an uplink peak transmission rate for a user is increased remarkably as compared with the $2^{nd}$ generation (2G) mobile communication technology. Based on scheduling modes, HSUPA service includes scheduled service and non-scheduled service. The resource for the non-scheduled service is mainly used for transmitting the data required to be processed in real time, such as signaling between a network and a mobile terminal, and services at a constant rate. The scheduled service is used to allocate HSUPA resources for a base station (Node B) via a Serving Radio Network Controller (SRNC) (which is mainly used for a specific terminal), and then allocate uplink resources for the terminal via Node B during the real-time data transmission. Node B transmits absolute authorization information to the terminal on an E-DCH Absolute Grant Channel (E-AGCH). One piece of the authorization information on the E-AGCH is used by one terminal at a time, and the duration of the authorization information is merely one Transmission Time Interval (TTI). In WCDMA99, TTI may be 2 ms for short frame transmission, or 10 ms or more. In TD-HSUPA, it is a fixed value, i.e., 5 ms. In 3GPP LTE and LTE-A, it is usually 1 ms. Since timeslots and code resources within a TTI are merely allocated for each authorization, the resource allocation within one TTI will certainly result in an increased scheduling delay and an increased system signaling overhead when the data in a buffer area of the mobile terminal is too big to be transmitted at once. An optional Resource Duration Indicator (RDI) is provided in a TD-SCDMA protocol, and through Radio Resource Control (RRC) configuration, the channel may carry a RDI parameter so as to allocate the authorization for the next frames in advance, e.g., to instruct the mobile terminal to continue using the authorization information in the following four TTIs. Through RDI configuration, it is able to reduce the work load for searching E-AGCH by the mobile terminal and reduce the frequency of transmitting E-AGCH by Node B.

In the scheduled service, when the terminal does not have HSUPA resources (rather than that the terminal is transmitting the scheduled or the non-scheduled service) but needs to upload data, the network needs to know in real time the data transmission condition of the terminal so as to reasonably allocate and use the wireless resources. As a result, the terminal needs to report Scheduling Information (SI) to Node B and request the authorization information so as to acquire scheduling of Node B.

Figure 1:
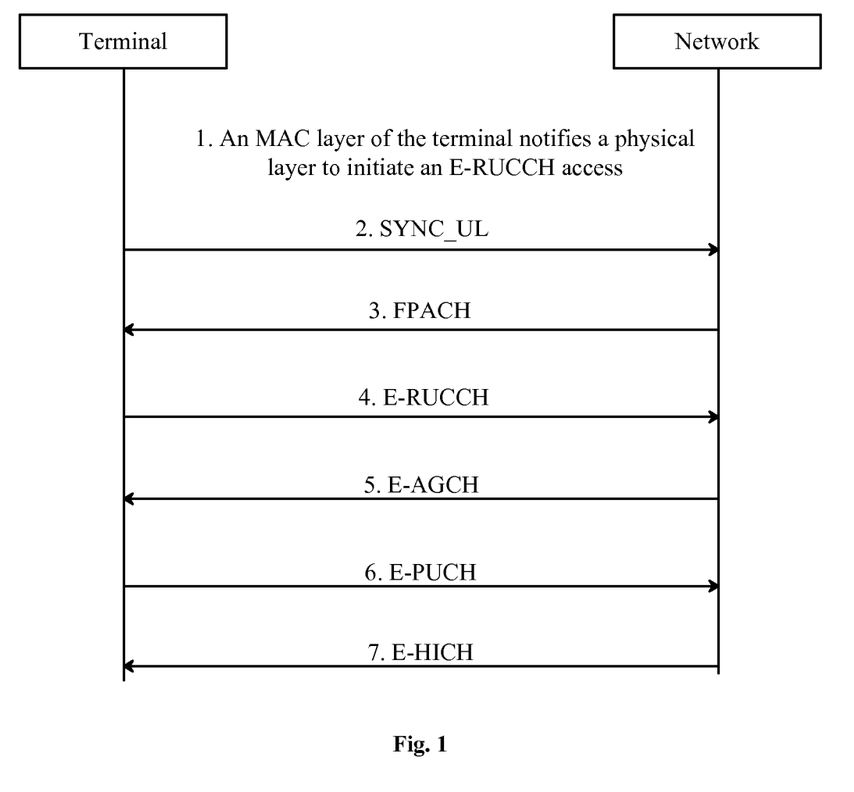
FIG. 1 is a flow chart of a signaling process for an E-RUCCH access of a mobile terminal in a current TD-SCDMA system.

Taking TD-SCDMA standard as an example, FIG. 1 shows the process comprising the following steps: (1) an MAC layer of a terminal notify a physical layer to initiate an E-RUCCH access; (2) the terminal transmits SYNC-UL for the E-RUCCH process on an uplink pilot time slot (UpPTS) channel; (3) the terminal receives information on a Fast Physical Access Channel (FPACH) on a fixed frame; (4) the terminal transmits E-RUCCH information on a Physical Random Access Channel (PRACH) in accordance with the physical information received on FPACH; (5) the network allocates the authorization information for the terminal in an E-DCH Absolute Grant Channel (E-AGCH) in accordance with the SI contained in the E-RUCCH information, and the terminal completes the E-RUCCH access so as to start a normal HSUPA data transmission process; (6) the terminal transmits uplink data on an E-DCH Physical Uplink Channel specified in E-AGCH; and (7) the terminal detects on an E-DCH Hybrid Automatic Repeat Request Indication Channel (E-HICH) whether or not an MAC-e PDU packet transmitted on E-PUCH has been received by the network correctly.

In step (6), the terminal transmits the MAC-e PDU carrying the SI via E-PUCH. The SI includes the amount of the buffer data and power headroom of the terminal, and path loss measurement information of a current cell and a neighboring cell. The network allocates the authorization information of a TTI for the terminal in accordance with the state information carried in the SI. In a data upload process, if desired, the terminal will require the network to continue allocation of the authorization information in the packets transmitted within each TTI, and the network will continue to allocate the authorization information for the terminal on E-AGCH in accordance with the SI.

During the HSUPA data transmission, in order to prevent the terminal from initiating some unnecessary E-RUCCH accesses, different protections are applied in the following two conditions by the protocol.

1. If the terminal has authorization information within a previous frame, and does not have authorization information in a current frame but has buffer data to be transmitted, it will start a timer T_WAIT. Before timeout of the timer T_WAIT, the network may transmit the authorization information to the terminal so as to transmit the buffer data. If no authorization information is received from the network until the timer T_WAIT is timed out, the terminal may initiate an E-RUCCH access to request authorization from the network.

2. If the terminal has authorization information within a previous frame, and has no authorization information in a current frame and no buffer data to be transmitted currently, alternatively, the network will configure an optional Extended Estimation Window for an MAC layer of the terminal. By use of the Extended Estimation Window, it is able to prevent a user from triggering unnecessary E-RUCCH transmission when there may exist available authorization over a small period of time in the future. For example, in the case of a hybrid automatic repeat request, whether the mobile terminal is authorized to transmit new data may be judged by looking up the Extended Estimation Window.

However, such configuration is merely an optional one, and the application of the Extended Estimation Window will increase processing burden of the network, so currently the terminal is not configured with an Extended Estimation Window by the network equipment vender. When the terminal has authorization information within a previous frame, and has no authorization information within a current frame and no buffer data to be transmitted currently, it will transmit an access request to the network immediately via E-RUCCH when the buffer data is desired to be transmitted, so as to request the network to allocate the authorization information. In the case of broken uplink transmission, i.e., when the terminal will upload data again within a short period of time after the data transmission, the E-RUCCH access will be triggered multiple times.

SUMMARY

In order to prevent a mobile terminal from unnecessary and frequent E-RUCCH access, the present invention provides an access method for an E-RUCCH of a mobile terminal, comprising:

Step 1: when upload data authorization information has expired and the amount of buffer data in a logical channel of the mobile terminal is zero, starting a timer;

Step 2: judging whether or not the timer is timed out, and if new upload data authorization information is received before the timer is timed out, resetting the timer and initiating an E-RUCCH access;

Step 3: if the upload data authorization information is not received before the timer is timed out, resetting the timer when the timer is timed out and judging whether there is any buffer data in the logical channel; and Step 4: when the amount of the buffer data in the logical channel exceeds a threshold of the buffer data in the logical channel, initiating the E-RUCCH access.

Prior to starting the timer, the method further comprises judging whether the mobile terminal is configured with an Extended Estimation Window or whether a Resource Duration Indicator (RDI) is received.

The timer is started when the judgment result is that the mobile terminal is not configured with the Extended Estimation Window, or no RDI is received.

Preferably, before the timer is timed out, resetting the timer and initiating the E-RUCCH access if there is buffer data in the logical channel carrying signaling data.

More preferably, when the logical channel carries the signaling data, the threshold of the amount of the buffer data in the logical channel is zero.

Even more preferably, when the logical channels carry service data and have different priorities, the threshold of the amount of the buffer data in the logical channel with the highest priority is zero, and the threshold of the amount of the buffer data in the logical channel with the second highest priority is greater than zero. Alternatively, the threshold of the amount of the buffer data in the logical channel with the highest priority is greater than zero and less than the threshold of the amount of the buffer data in the logical channel with the second highest priority.

The present invention further provides a mobile terminal comprising an upload data authorization information receiving module, an E-RUCCH accessing module, a timer, a logical channel data buffering module configured to buffer the data to be uploaded in a logical channel of the mobile terminal, a timer starting module configured to notify the timer to start when it is judged that the upload data authorization information receiving module does not include authorization information within the expiry date and the amount of the buffer data in the logical channel data buffering module is zero, a timer resetting module configured to judge whether the timer is timed out, reset the timer and notify the E-RUCCH accessing module to initiate an E-RUCCH access when a notice of valid authorization information is received from the upload data authorization information receiving module before the timer is timed out, and reset the timer T_DELAY and notify a buffer data amount threshold module when the timer T_DELAY is timed out, and a buffer data amount threshold module configured to store a threshold table of the amount of the buffer data in logical channel, judge whether the amount of the buffer data in the logical channel data buffering module exceeds a corresponding threshold in the threshold table of the amount of the buffer data in logical channel after receiving a notice from the timer resetting module, and notify the E-RUCCH accessing module to initiate the E-RUCCH access when the buffer data amount exceeds the threshold.

The mobile terminal further comprises an Extended Estimation Window/Resource Duration Indicator judging module configured to judge whether the mobile terminal is configured with an Extended Estimation Window or whether a Resource Duration Indicator is received.

The timer starting module is specifically configured to notify the Extended Estimation Window/Resource Duration Indicator judging module when it is judged that the upload data authorization information receiving module does not include authorization information within the expiry date and the amount of the buffer data in the logical channel data buffering module is zero, and notify the timer to start when the judgment result of the Extended Estimation Window/Resource Duration Indicator judging module is that the mobile terminal is not configured with the Extended Estimation Window or no Resource Duration Indicator is received.

Preferably, the logical channel data buffering module is further configured to notify the timer resetting module when the amount of buffer data in the logical channel carrying signaling data is greater than zero.

The timer resetting module is further configured to reset the timer when a notice indicating that the amount of the signaling data is greater than zero is received before the timer is timed out, and notify the E-RUCCH accessing module to initiate the E-RUCCH access.

More preferably, in the threshold table stored in the logical channel buffer data amount threshold module, the threshold of the amount of buffer data in the logical channel carrying the signaling data is zero.

Even more preferably, when the logical channels carrying service data have different priorities, in the threshold table, the threshold of the amount of the buffer data in the logical channel with the highest priority is zero, and the threshold of the amount of the buffer data in the logical channel with the second highest priority is greater than zero. Alternatively, in the threshold table, the threshold of the amount of the buffer data in the logical channel with the highest priority is greater than zero and less than the threshold of the amount of the buffer data in the logical channel with the second highest priority.

Through the above-mentioned method or mobile terminal, it is able to control the E-RUCCH access time for the mobile terminal by customizing the timer, the priorities of the logical channels and the amount of the buffer data in the logical channel, thereby to prevent the mobile terminal from initiating unnecessary and frequent accesses and to reduce resource consumption of the network and power consumption of the mobile terminal

DETAILED DESCRIPTION

To make the objects, the steps and the advantages of the present invention more apparent, the present invention is described in details hereinafter in conjunction with the drawings.

The present invention provides an access method for an E-DCH Random Uplink Control Channel (E-RUCCH), which comprises the steps of:

Step 1: when upload data authorization information has expired and the amount of buffer data in a logical channel of the mobile terminal is zero, starting a timer;

Step 2: judging whether or not the timer is timed out, and if new upload data authorization information is received before the timer is timed out, resetting the timer and initiating an E-RUCCH access;

Step 3: if the upload data authorization information is not received before the timer is timed out, resetting the timer when the timer is timed out and judging whether there is any buffer data in the logical channel; and Step 4: when the amount of the buffer data in the logical channel exceeds a threshold of the amount of the buffer data in the logical channel, initiating the E-RUCCH access.

Figure 2:
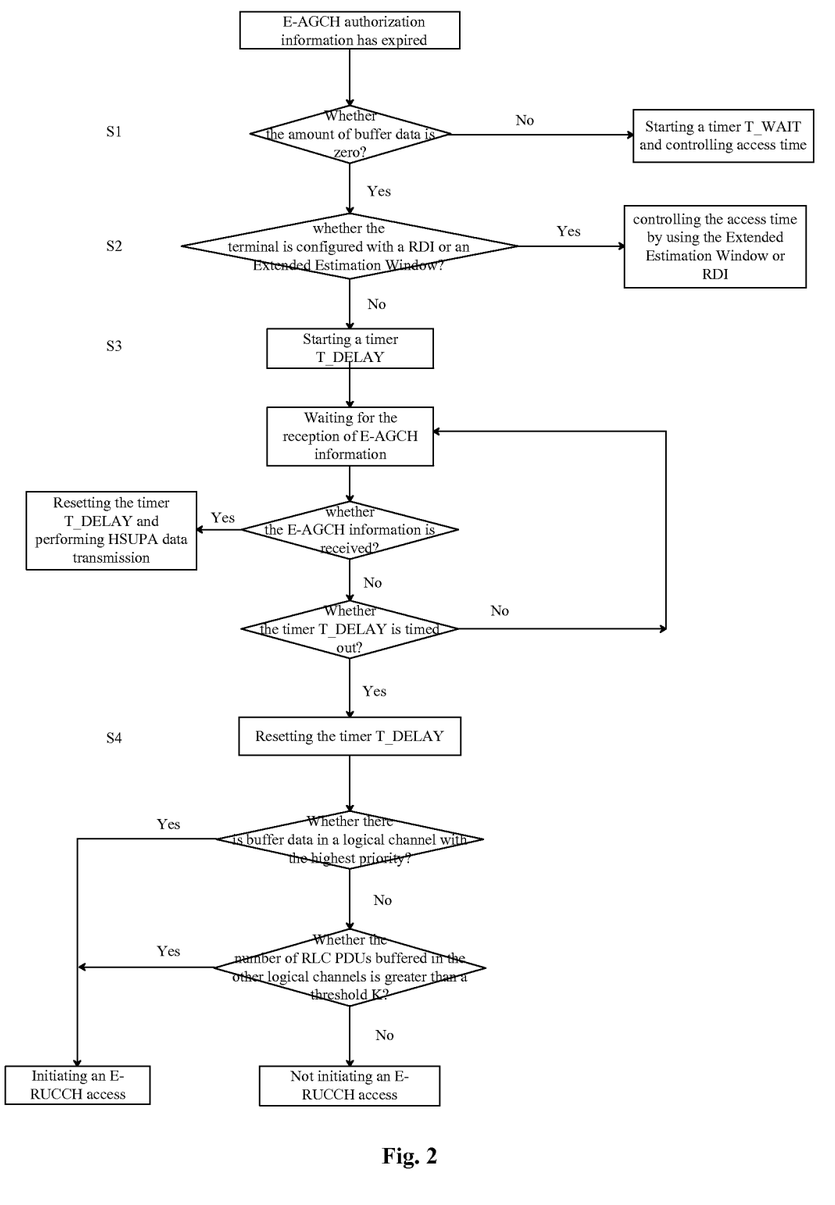
FIG. 2 is a flow chart of a method according to embodiments of the present invention.

As shown in FIG. 2, the method comprises the steps.

Step S1: transmitting, by the mobile terminal, data in accordance with authorization information from Node B, judging whether the amount of buffer data in the logical channel is zero after the data at the last TTI to which an recent E-AGCH authorization is applied is transmitted, if the amount of the buffer data is greater than 0, starting a timer T_WAIT, controlling the access by using the timer T_WAIT, and waiting for the authorization information that may be allocated by a network for the mobile terminal subsequently, and if the amount of the buffer data is equal to zero, proceeding to Step S2;

Step S2: judging whether the mobile terminal is configured with an Extended Estimation Window by the network, if the mobile terminal is configured with the Extended Estimation Window, judging whether the Extended Estimation Window is configured with a RDI, if the Extended Estimation Window is configured with the RDI previously, not initiating an E-RUCCH access immediately but controlling the E-RUCCH access time by using the Extended Estimation Window and the RDI. The Extended Estimation Window is usually at a millisecond level. If the Extended Estimation Window has a length of 5 TTIs and each TTI is defined as 5 ms, detecting whether there exists a previously configured RDI authorization in the next 25 ms, and if the mobile terminal is configured with the Extended Estimation Window without any RDI, or the mobile terminal is not configured with the Extended Estimation Window, proceeding to Step S3.

Step S3: starting a timer T_DELAY customized by the mobile terminal, and waiting for scheduling authorization information that may be allocated by the network. T_DELAY has a length of, preferably, 2 to 5 TTIs, and more preferably, 5 TTIs.

If the network allocates the E-AGCH scheduling authorization information for the mobile terminal before the timeout of the timer T_DELAY, the mobile terminal will stop the timer T_DELAY and perform HSUPA data transmission in accordance with the authorization information. Otherwise, the mobile terminal will continue to wait for the E-AGCH scheduling authorization information in the case that the timer T_DELAY is not timed out. The procedure proceeds to Step S4 after the timer is timed out.

The timer T_DELAY is mainly provided for the following two purposes. (1) The mobile terminal will wait for scheduling resources allocated by the network before the timer T_DELAY is timed out, and as a result, the mobile terminal will be prevented from initiating invalid E-RUCCH access in advance. (2) Even if no authorization information is received by the mobile terminal from the network when the timer is timed out, the mobile terminal may initiate the E-RUCCH access upon accumulation of the data, rather than initiate the access once there is the buffer data.

S4: after the timer T_DELAY is timed out, stopping and resetting the timer T_DELAY.

When establishing the HSUPA transmission initially, the network will configure the mobile terminal with the number of logical channels for the transmission, and the priority of each logical channel. At most fifteen logical channels and eight priorities (0 to 7) will be configured. Four of the logical channels are used to carry the signaling data, and these channels have different priorities. Usually, the logical channel carrying a signaling plane has a priority higher than the logical channel carrying service data. At this time, if there is any buffer data in the logical channel with the highest priority, an MAC layer will initiate the E-RUCCH access immediately, so as to ensure timely transmission of the signaling data with a high priority. If there is no buffer data in the logical channel with the highest priority and the number of RLC PDUs buffered in the logical channels with the other priorities (called as the second highest priority) is greater than a threshold K, the MAC layer will initiate the E-RUCCH access immediately. Otherwise, the MAC layer will continue to wait for data from an application layer and initiate the access when the number of RLC PDUs buffered in the logical channels is greater than K. Alternatively, the priorities of the logical channels carrying the signaling data may be ignored, and the MAC layer will initiate the E-RUCCH access once there is any buffer data in the signaling channel, so as to ensure timely upload of the signaling data.

Through this method, it is able to control the E-RUCCH access time in accordance with the priorities of the logical channels and the amount of the buffer data, thereby to prevent the mobile terminal from initiating the E-RUCCH access frequently and to reduce resource consumption of the network and power consumption of the mobile terminal. In addition, through customizing the timer T_DELAY, it is able to prevent the mobile terminal from initiating the E-RUCCH access immediately when the data is to be transmitted again within a short period of time after the mobile terminals has transmitted the data. Especially, an allocation strategy of some networks on E-AGCH is to periodically allocate E-AGCH authorization for a plurality of users in a current cell, and the advantages of the timer T_DELAY may be reflected in a better manner in these networks. This is because, the mobile terminal may receive the E-AGCH authorization from the network before the timer T_DELAY is timed out, and then transmit the data in accordance with the authorization, thereby to prevent the mobile terminal from initiating invalid E-RUCCH access in advance.

During the entire procedure, no matter whether the timer T_DELAY is stopped before or after the timeout thereof, it will be restarted only when the mobile terminal starts to transmit the data after the initiation of the E-RUCCH access, the amount of the buffer data in the logical channel is zero after the data at the last TTI to which the recent E-AGCH authorization is applied has been transmitted, and no Extended Estimation Window or RDI is configured by the network. That is, the procedure will proceed to Step S3.

A preferable scheme for Step S4 is to select different thresholds Ki in accordance with the priority levels. For example, the threshold of the amount of the buffer data in the logical channel with a priority of 1 (the highest priority is 0) is set as K1, the threshold of the amount of the buffer data in the logical channel with a priority of 2 is set as K2, ..., and K1<K2. For a logical channel with a lower priority, the access is allowed to be initiated when more buffer data is accumulated. When there is no buffer data in the channels with the priories of 0 and 1, or the amount of the buffer data in the channel with a priority of 1 is less than K1, the mobile terminal will trigger the E-RUCCH access only if the number of PDUs buffered in the channel with a priority of 2 is greater than K2. Alternatively, a small number of gradient values for the thresholds may be defined. For example, the threshold of the amount of the buffer data in the logical channels with the priorities of 1 to 3 may be set as K1, and the threshold of the amount of the buffer data in the logical channels with the lower priorities may be set as K2. A more preferable scheme is to set the threshold of the amount of the buffer data in the signaling channels as zero, and to set the thresholds of the amount of the buffer data in the service channels as mentioned above.

When the amount of the buffer data is less than the threshold, for example, when there is only one RLC PDU, this PDU may probably a state packet generated by a RLC layer of the terminal periodically. Of course, it is unnecessary to initiate the E-RUCCH access for this state packet. Usually, if the data of an application layer needs to be transmitted, the data volume is relatively big and it requires a plurality of RLC PDUs to receive the data, so the threshold may be set to control the access time.

Figure 3:
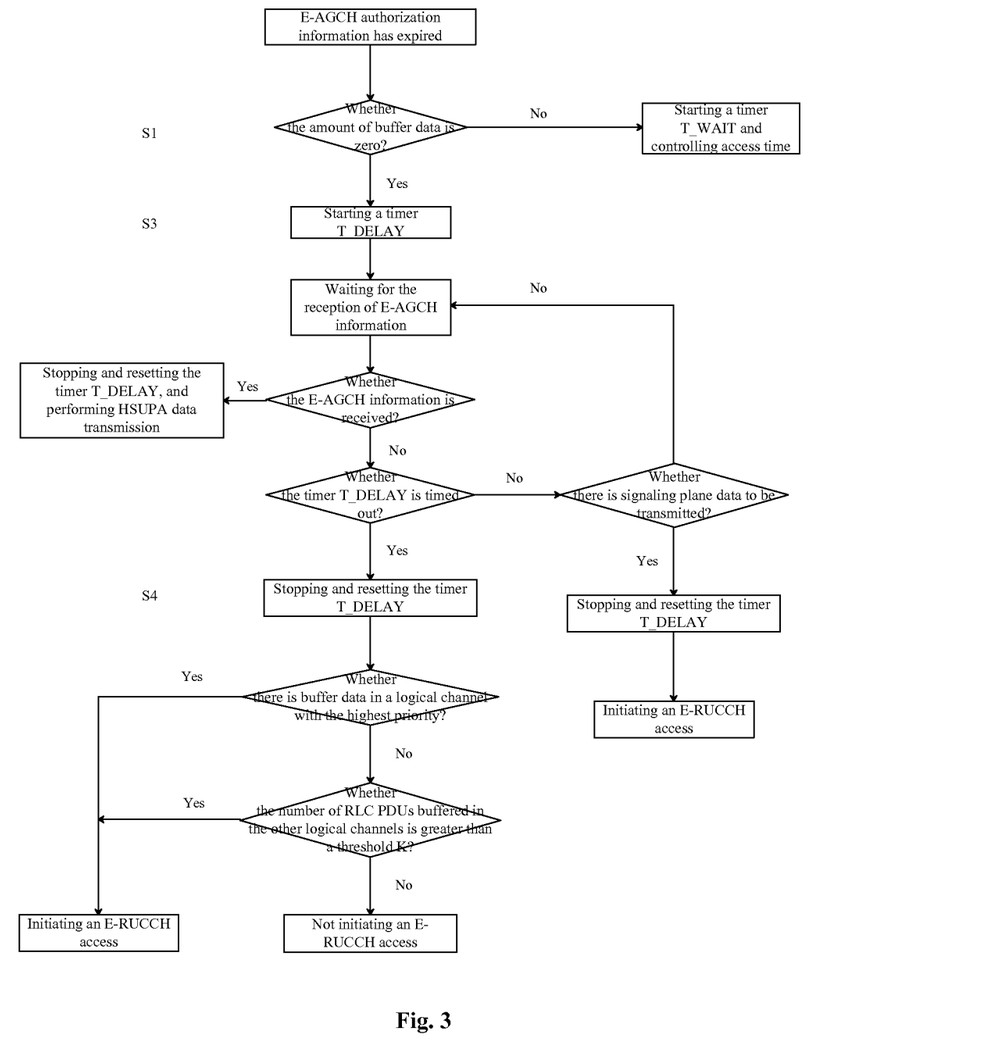
FIG. 3 is a flow chart of a method according to embodiments of the present invention.

In a preferred embodiment, as shown in FIG. 3, Step S3 specifically comprises:

Step S31: if the network has E-AGCH scheduling authorization information to be allocated for the terminal before a timer T_DELAY is timed out, stopping, by the mobile terminal, the timer T_DELAY and performing HSUPA data transmission in accordance with the authorization information, otherwise, in the case that the timer T_DELAY is not timed out, proceeding to Step S32, and after the timer is timed out, proceeding to step S4; and Step S32: if there is signaling plane data to be transmitted before the timer T_DELAY is timed out, stopping the timer T_DELAY and initiating the E-RUCCH access immediately, and if there is no signaling plane data to be transmitted before the timer T_DELAY is timed out, continuing to wait for the E-AGCH scheduling authorization information.

Such a manner of detecting whether there is signaling plane data to be transmitted and stopping the delay of the E-RUCCH access when there is signaling plane data to be transmitted will not affect the transmission of the signaling plane data. As for service plane data, the access time may be controlled by customizing the timer T_DELAY, the priorities of the logical channels and the amount of the buffer data in the logical channels. As a result, it is able to control the access time without affecting the transmission of the data with high priorities.

Therefore, apart from triggering the E-RUCCH access of the mobile terminal when there is buffer data in the logical channel with the highest priority or triggering the E-RUCCH access of the MAC layer when there is buffer data in the signaling channel so as to ensure timely transmission of the signaling data, in Step S4, the E-RUCCH access of the mobile terminal may also be triggered immediately once there is buffer data in the logical channel with the highest priority for transmitting the service data. The thresholds of the amount of the buffer data in the other logical channels carrying the service plane data may be set in accordance with the number of the logical channels. For example, when there are three logical channels carrying the service plane data, the threshold K1 of the amount of the buffer data in the logical channel with the highest priority may be set as zero, the threshold K2 of the amount of the buffer data in the logical channel with the second highest priority may be set as one RLC PDU, and the threshold K3 of the amount of the buffer data in the logical channel with the lowest priority may be set as two RLC PDUs. Preferably, if there are more than three logical channels carrying the service data, an upper limit of the threshold may be set as two RLC PDUs. Since new data transmission will be always periodically generated through the timer in the application layer, such a threshold is merely used to delay the access temporarily, without causing a failed access all the time.

In another embodiment, as described above, currently the mobile terminal is seldom configured with an Extended Estimation Window by the network equipment venders due to the inconvenience caused thereby. Also, because the RDI is an optional configuration and a RDI algorithm is complex, the RDI is seldom provided by the networks. As a result, Step S2 may be removed. As shown in FIG. 3, when it is judged that the amount of the buffer data is zero, the timer T_DELAY is started directly.

Figure 4:
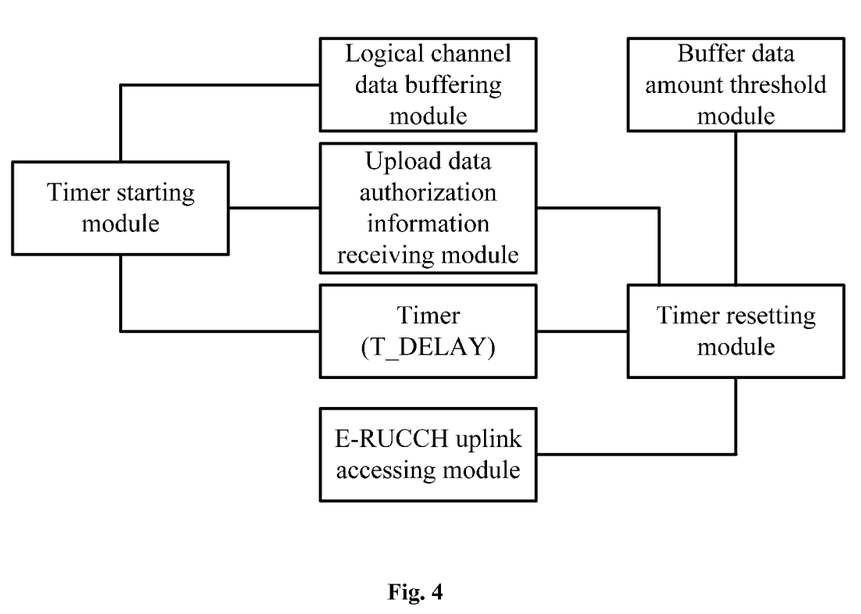
FIG. 4 is a structural schematic view showing a mobile terminal according to embodiments of the present invention.

According to the above embodiments, the mobile terminal will not initiate the E-RUCCH access frequently in the case that very few, unnecessary or less-urgent data are required to be uploaded. Moreover, as shown in FIG. 1, a complex uplink synchronization process is required to perform the E-RUCCH access and there may be competitive conflicts in E-RUCCH as a common channel. As a result, the prevention of the E-RUCCH access initiated by the mobile terminal multiple times will reduce the resource consumption of the network and the power consumption of the mobile terminal As shown in FIG. 4, the present invention provides a mobile terminal, comprising an upload data authorization information receiving module, an E-RUCCH accessing module, a timer T_DELAY, a logical channel data buffering module, a timer starting module, a time resetting module and a buffer data amount threshold module, wherein the logical channel data buffering module is configured to buffer the data to be uploaded in a logical channel of the mobile terminal;

the timer starting module is configured to notify the timer to start when it is judged that the upload data authorization information receiving module does not include authorization information within the expiry date and the amount of buffer data in the logical channel data buffering module is zero;

the timer resetting module is configured to judge whether the timer is timed out, reset the timer and notify the E-RUCCH accessing module to initiate an E-RUCCH access when a notice of valid authorization information is received from the upload data authorization information receiving module before the timer T_DELAY is timed out, and reset the timer T_DELAY and notify the buffer data amount threshold module when the timer T_DELAY is timed out; and the buffer data amount threshold module is configured to store a threshold table of the amount of the buffer data in the logical channel, judge whether the amount of the buffer data in the logical channel data buffering module exceeds a corresponding threshold in the threshold table of the amount of the buffer data in the logical channel after receiving a notice from the timer resetting module, and notify the E-RUCCH accessing module to initiate the E-RUCCH access when the amount of the buffer data exceeds the threshold.

In another embodiment, the mobile terminal further comprises an Extended Estimation Window/Resource Duration Indicator judging module configured to judge whether the mobile terminal is configured with an Extended Estimation Window or whether a Resource Duration Indicator is received.

Correspondingly, the timer starting module is specifically configured to notify the Extended Estimation Window/Resource Duration Indicator judging module when it is judged that the upload data authorization information receiving module does not include authorization information within the expiry date and the amount of the buffer data in the logical channel data buffering module is zero, and notify the timer T_DELAY to start when the judgment result of the Extended Estimation Window/Resource Duration Indicator judging module is that the mobile terminal is not configured with the Extended Estimation Window or no Resource Duration Indicator is received.

In a preferred embodiment, the logical channel data buffering module is further configured to notify the timer resetting module when the buffer data amount in the logical channel carrying signaling data is greater than zero.

Correspondingly, the timer resetting module is further configured to reset the timer T_DELAY when a notice indicating that the signaling data amount is greater than zero is received before the timer T_DELAY is timed out, and notify the E-RUCCH accessing module to initiate the E-RUCCH access.

In a more preferred embodiment, in the threshold table stored in the buffer data amount threshold module, the threshold of the amount of the buffer data in the logical channel carrying the signaling data is zero. As a result, the signaling data generated by the mobile terminal may be uploaded to the network in time.

In yet a more preferred embodiment, when the logical channels carrying service data have different priorities, in the threshold table, the threshold of the amount of the buffer data in the logical channel with the highest priority is zero, and the threshold of the amount of the buffer data in the logical channel with the second highest priority is greater than zero. That is, the service data with the highest priority can be uploaded to the network in time without being delayed by the timer T_DELAY.

Alternatively, in the threshold table, the threshold of the amount of the buffer data in the logical channel carrying the service data with the highest priority is greater than zero and less than the threshold of the amount of the buffer data in the logical channel carrying the service data with the second highest priority (the logical channel carrying the service data is called service channel for short). That is, different thresholds of the amount of the buffer data are set in accordance with different priorities of the service channels, and the mobile terminal will initiate the E-RUCCH access only when the amount of the buffer data in the service channel with the highest priority exceeds the threshold.

Through the above-mentioned mobile terminal, it is able to control the E-RUCCH access time for the mobile terminal by customizing the timer, the priorities of the logical channels and the buffer data amount in the logical channels, thereby to prevent the mobile terminal from initiating unnecessary, frequent E-RUCCH access and to reduce resource consumption of the network and power consumption of the mobile terminal The above are merely the embodiments of the present invention. It should be noted that, a person skilled in the art may further make improvements and modifications without departing from the principle of the present invention, and these improvements and modifications shall also be considered as the scope of the present invention.

What is claimed is:

1. An access method for E-DCH (Enhanced Dedicated Channel) Random Access Uplink Control Channel (E-RUCCH) of a mobile terminal, comprising:
   determining whether upload data authorization information has expired;
   determining whether an amount of buffer data in a logical channel of the mobile terminal is zero;
   starting a timer when it is determined that the upload data authorization information has expired and the amount of buffer data in the logical channel of the mobile terminal is zero;
   determining whether the timer is timed out;
   determining whether new upload data authorization is received by the mobile terminal;
   resetting the timer and initiating an E-RUCCH access if it is determined that the new upload data authorization information is received before the timer is timed out;
   resetting the timer and determining whether there is any buffer data in the logical channel if it is determined that the upload data authorization information is not received before the timer is timed out; and
   initiating the E-RUCCH access when the amount of the buffer data in the logical channel exceeds a threshold of the buffer data in the logical channel.

2. An access method for E-DCH (Enhanced Dedicated Channel) Random Access Uplink Control Channel (E-RUCCH) of a mobile terminal, comprising:
   Step 1: starting a timer when upload data authorization information has expired and an amount of buffer data in a logical channel of the mobile terminal is zero;
   Step 2: judging whether or not the timer is timed out, and if new upload data authorization information is received before the timer is timed out, resetting the timer and initiating an E-RUCCH access;
   Step 3: resetting the timer when the timer is timed out and judging whether there is any buffer data in the logical channel if the upload data authorization information is not received before the timer is timed out; and
   Step 4: initiating the E-RUCCH access when the amount of the buffer data in the logical channel exceeds a threshold of the buffer data in the logical channel,
   wherein
   prior to starting the timer, the method further comprises judging whether the mobile terminal is configured with an Extended Estimation Window or whether a Resource Duration Indicator (RDI) is received, and
   the timer is started when the judgment result is that the mobile terminal is not configured with the Extended Estimation Window, or no RDI is received.

3. The access method according to claim 1, wherein the method further comprises:
   before the timer is timed out, resetting the timer and initiating the E-RUCCH access if there is buffer data in the logical channel carrying signalling data.

4. The access method according to claim 1, wherein:
   when the logical channel carries the signalling data, the threshold of the amount of the buffer data in the logical channel is zero.

5. The access method according to claim 1, wherein:
   when the logical channels carry service data and have different priorities, the threshold of the amount of the buffer data in the logical channel with the highest priority is zero, and the threshold of the amount of the buffer data in the logical channel with the second highest priority is greater than zero, or the threshold of the amount of the buffer data in the logical channel with the highest priority is greater than zero and less than the threshold of the amount of the buffer data in the logical channel with the second highest priority.

6. A mobile terminal, comprising:
a receiver;
a transmitter; and
a non-transitory memory storing software comprising
 an upload data authorization information receiving module, and
 an E-RUCCH accessing module,
 a timer,
 a logical channel data buffering module, configured to buffer the data to be uploaded in a logical channel of the mobile terminal;
 a timer starting module, configured to notify the timer to start when it is judged that the upload data authorization information receiving module does not include authorization information within the expiry date and the amount of the buffer data in the logical channel data buffering module is zero;
 a timer resetting module, configured to judge whether the timer is timed out, reset the timer and notify the E-RUCCH accessing module to initiate an E-RUCCH access using the transmitter when a notice of valid authorization information is received from the upload data authorization information receiving module from the receiver before the timer is timed out, and reset the timer T_DELAY and notify a buffer data amount threshold module when the timer T_DELAY is timed out; and
the buffer data amount threshold module, configured to store a threshold table of the amount of the buffer data in the logical channel, judge whether the amount of the buffer data in the logical channel data buffering module exceeds a corresponding threshold in the threshold table of the amount of the buffer data in logical channel after receiving a notice from the timer resetting module, and notify the E-RUCCH accessing module to initiate the E-RUCCH access using the transmitter when the buffer data amount exceeds the threshold.

7. The mobile terminal according to claim 6, wherein:
the mobile terminal further comprises a judging module configured to judge whether the mobile terminal is configured with an Extended Estimation Window or whether a Resource Duration Indicator is received, and
the timer starting module is specifically configured to notify the judging module when it is judged that the upload data authorization information receiving module does not include authorization information within the expiry date and the amount of the buffer data in the logical channel data buffering module is zero, and notify the timer to start when the judgment result of the judging module is that the mobile terminal is not configured with the Extended Estimation Window or no Resource Duration Indicator is received.

8. The mobile terminal according to claim 6, wherein:
the logical channel data buffering module is further configured to notify the timer resetting module when the amount of buffer data in the logical channel carrying signalling data is greater than zero, and
the timer resetting module is further configured to reset the timer when a notice indicating that the amount of the signalling data is greater than zero is received before the timer is timed out, and notify the E-RUCCH accessing module to initiate the E-RUCCH access.

9. The mobile terminal according to claim 6, wherein:
in the threshold table stored in the logical channel buffer data amount threshold module, the threshold of the amount of buffer data in the logical channel carrying the signalling data is zero.

10. The mobile terminal according to claim 9, wherein:
when the logical channels carrying service data have different priorities, in the threshold table, the threshold of the amount of the buffer data in the logical channel with the highest priority is zero, and the threshold of the amount of the buffer data in the logical channel with the second highest priority is greater than zero, or in the threshold table, the threshold of the amount of the buffer data in the logical channel with the highest priority is greater than zero and less than the threshold of the amount of the buffer data in the logical channel with the second highest priority.

* * * * *